US010965818B1

(12) United States Patent
Britt et al.

(10) Patent No.: US 10,965,818 B1
(45) Date of Patent: *Mar. 30, 2021

(54) APPARATUS AND METHOD FOR USER CONFIGURATION AND REPORTING OF VIRTUAL SERVICES

(71) Applicant: 8x8, Inc., San Jose, CA (US)

(72) Inventors: Timothy Britt, San Jose, CA (US); Bryan Martin, San Jose, CA (US); Christopher Peters, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,314

(22) Filed: Aug. 21, 2019

Related U.S. Application Data

(63) Continuation of application No. 14/578,609, filed on Dec. 22, 2014, now Pat. No. 10,397,407.

(60) Provisional application No. 61/983,792, filed on Apr. 24, 2014.

(51) Int. Cl.
*H04M 7/00* (2006.01)
*H04L 12/24* (2006.01)

(52) U.S. Cl.
CPC .......... *H04M 7/0084* (2013.01); *H04L 41/22* (2013.01)

(58) Field of Classification Search
CPC .......... H04M 7/00; H04L 47/24; H04L 41/22; H04L 29/00; H04L 67/00
See application file for complete search history.

(56) References Cited

U.S. PATENT DOCUMENTS

| 7,289,491 | B2 | 10/2007 | Singh |
| 8,204,206 | B2 | 6/2012 | Townsend |
| 8,484,355 | B1 | 7/2013 | Lochhead et al. |
| 2002/0184575 | A1 | 12/2002 | Landan |

(Continued)

FOREIGN PATENT DOCUMENTS

WO 1996042041 A2 12/1996

OTHER PUBLICATIONS

International Telecommunications Union, Series P: Telephone Transmission Quality, Telephone Installations, Local Line Networks, ITU-T Recommendation P.862, "Perceptual evaluation of speech quality (PESQ): An objective method for end-to-end speech quality assessment of narrow-band telephone networks and speech codecs," Feb. 2001.

(Continued)

Primary Examiner — Kent Krueger
(74) Attorney, Agent, or Firm — Crawford Maunu PLLC

(57) ABSTRACT

Various example implementations are directed to circuits, apparatuses, and methods for providing virtual computing services. According to an example embodiment, an apparatus includes a set of computing servers configured to provide a respective set of virtual servers for each of a plurality of accounts. The set of virtual servers for at least one of the accounts includes a voice-over-IP (VoIP) server. The apparatus also includes a processing circuit communicatively coupled to the set of computing servers. For each of the plurality of accounts, the processing circuit provides a graphical user interface (GUI) including a mechanism for an authorized user of the account to select options for reporting usage of the respective set of virtual servers. The processing circuit also monitors use of the respective set of virtual servers for the account and generates invoices for use of the (Continued)

respective set of virtual servers according to the selected options.

20 Claims, 4 Drawing Sheets

(56) References Cited

U.S. PATENT DOCUMENTS

2004/0162781 A1  8/2004  Searl et al.
2009/0144413 A1  6/2009  Khan et al.
2014/0344326 A1  11/2014  Kamath et al.

OTHER PUBLICATIONS

Radvision, "Back-To-Back User Agent (B2BUA) SIP Servers Powering Next Generation Networks: A Functional and Architectural Look At Back-To-Back User Agent (B2BUA) SIP Servers," 2007.

APPARATUS AND METHOD FOR USER CONFIGURATION AND REPORTING OF VIRTUAL SERVICES

OVERVIEW

Various example implementations are directed to circuits, apparatuses, and methods for providing virtual computing services. These include such services provided by computing servers that provide various services over a network including, but not limited to, website hosting, remote data storage, remote computing services (or remote services), virtual computing environments and communication services such as: Voice-over-IP (VoIP), video conferencing, call exchange servers, packet switching, and traffic management.

According to an example embodiment, an apparatus includes a set of computing servers configured to provide a respective set of virtual servers for each of a plurality of accounts. The set of virtual servers for at least one of the accounts includes a VoIP server. The apparatus also includes a processing circuit communicatively coupled to the set of computing servers. For each of the plurality of accounts, the processing circuit provides a graphical user interface (GUI) including a mechanism for an authorized user of the account to select options for reporting use of the respective set of virtual servers. The processing circuit also monitors use of the respective set of virtual servers for the account and generates invoices for use of the respective set of virtual servers according to the selected reporting options.

In another example embodiment, a method uses a set of computing servers, a respective set of virtual servers is provided for each of a plurality of accounts. The set of virtual servers for at least one of the accounts includes a VoIP server. For each of the accounts, a GUI is provided that includes a mechanism for an authorized user of the account to select options for reporting usage of the respective set of virtual servers. Use of the virtual servers for each account is monitored. Invoices for use of the respective set of virtual servers are generated according to the selected reporting options for the set of virtual servers.

BRIEF DESCRIPTION OF THE DRAWINGS

The disclosure may be more completely understood in consideration of the following detailed description of various embodiments of the disclosure in connection with the accompanying drawings, in which.

Figure 1:
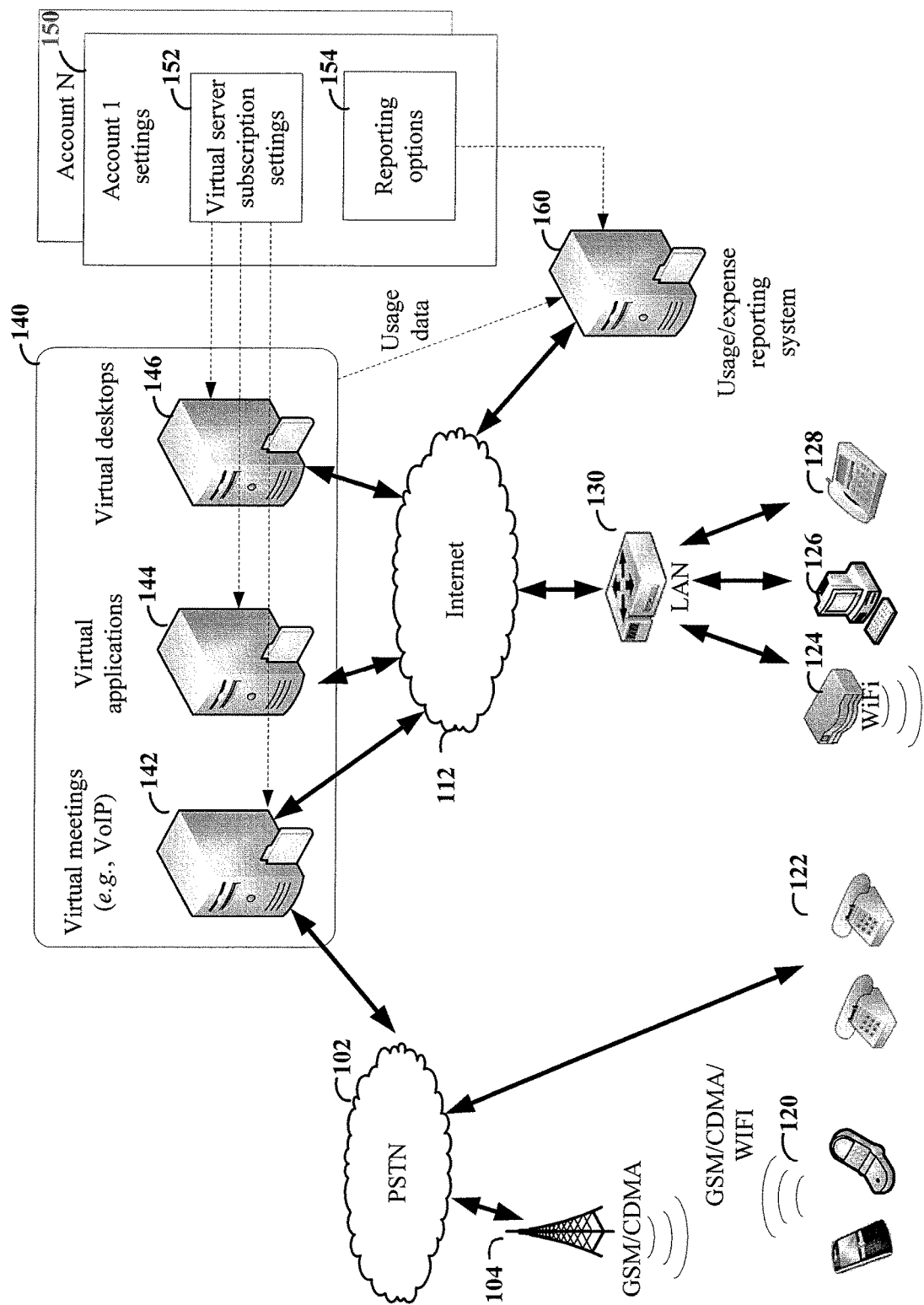
FIG. 1 shows an example network architecture having a set of servers configured to provide virtual servers and customizable reporting for a plurality of accounts.

While various embodiments discussed herein are amenable to modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems, and methods that use of computing servers to provide respective virtual services for each of a plurality of customer accounts. In certain implementations, aspects of the present disclosure have been shown to be beneficial when used in the context of monitoring and reporting on usage of virtual services for each customer account. While not necessarily so limited, various aspects may be appreciated through a discussion of examples using such exemplary contexts.

In one or more implementations, an apparatus includes one or more computing servers configured to provide a respective set of virtual servers for each of a plurality of accounts. The virtual servers are indicated in respective settings files for the account. The virtual servers may provide various types of services including, for example file servers, email servers, web hosting, virtual meeting services (e.g., VoIP), and/or remote computing services (e.g., virtual desktops), routing, load balancing, and/or switch board services (e.g., Private Branch Exchange). In some implementations the set of virtual servers for an account may be interconnected with virtual connections to form a virtual data center. In some embodiments, each account may provide subsets of the virtual servers to third-party customers serviced by the owner of the account. For instance, each of the set of virtual servers may be provided for a respective third-party customer.

In various embodiments, a processing circuit communicatively coupled to the computing servers is configured to provide a reporting system for the plurality of accounts. In some implementations, the processing circuit is configured to provide a GUI having a mechanism for an authorized user of the account to select options for reporting use of the respective set of virtual servers. In some implementations, the GUI may also include a mechanism for the authorized user to select and/or configure the set of virtual servers to be provided for the account. As an example, the GUI may provide an interface for the authorized user to add/remove users or third-party customers for the account, configure virtual servers to be provided for each user or third-party customer, and/or configure reporting options for use of the virtual servers by each of the users or third-party customers. The GUI may further be configured to adjust reporting options and generate usage and/or expense reports for each account, user and/or third-party customers according to service rates in the reporting options. Service rates may be specified as a fixed fee for a reporting period or may be specified as a function of an amount of usage (e.g., processing time, resource usage and/or bandwidth usage).

In some embodiments, the processing circuit is further configured to monitor usage of the virtual servers provided for the account, by the users or third-party customers, and generate reports for use of the virtual servers according to the reporting options selected by the authorized user. For example, the authorized user may create and configure an account to provide respective virtual servers for various company departments of a company and configure reporting options to generate a single usage report for all virtual servers provided for the company. The single usage report may include, for example, expenses for usage of the virtual servers-thereby allowing the company to assess use of the virtual servers for a single report. In some instances, the reporting options may be configured to cause the processing circuit to additionally or alternatively generate individual reports for individual users or groups of users (e.g., departments). The individual reports may be used, for example, for internal tracking of expenses within the company. In some instances, an owner of an account may use the virtual servers to provide services to third party customers. Reporting options may be set to generate a respective usage and/or expense report for each third-party customer based on use of the services by the third-party customer and service rates set by the authorized user.

Turning now to the figures, FIG. 1 shows an example network architecture having a set of computing servers configured to provide virtual servers and customizable reporting for a plurality of accounts. The computing servers 140 provide virtual servers to various end-point devices including, for example, mobile devices 120, plain-old telephones (POTS) 122, computer(s) 126 and IP phones 128. The computing servers 140 provide a respective set of virtual servers for each of a plurality of accounts serviced by the computing servers. In this example, the virtual servers to be provided for each account are specified by virtual server subscription settings 152 included in an account settings file 150 for the account.

The computing servers may be configured to provide various virtual servers for each account. In this example, the computing servers 140 include a first server 142 configured to provide virtual meeting services (e.g., via VoIP), a second server 144 configured to provide virtual application services and a third server 146 configured to provide virtual desktop services. The application servers may be, for example, Virtual Private Servers (VPS) or enterprise servers. Data transactions related to the remote services provided by the computing servers 140 are communicated between the computing servers and the users of the account over various data networks. The data networks may include, for example, the Internet 112, public service telephone networks (PSTN) 102, wireless networks 104 (e.g., GSM, CDMA, or LTE), and private data networks, including, but not limited to LAN 130, WiFi network 124, and/or Private Branch Exchange servers (not shown).

A usage/expense reporting system 160 is implemented by a processing circuit communicatively coupled to the set of computing servers. The usage/expense reporting system 160 is configured to monitor use of the virtual servers provided for each account and generate usage and/or expense reports for the virtual servers according to the reporting options 154 specified in the settings file 150 for the account. The reporting options 154 may include, for example, service rates 154 for user of the virtual servers. In some implementations, the usage/expense reporting system 160 may provide a GUI including a mechanism for an authorized user of an account to select or adjust the reporting options 154 in the settings file 150 for the account. In some implementations, the GUI may also provide a mechanism to select or configure virtual server subscription settings 152 in the settings file 150.

Figure 2:
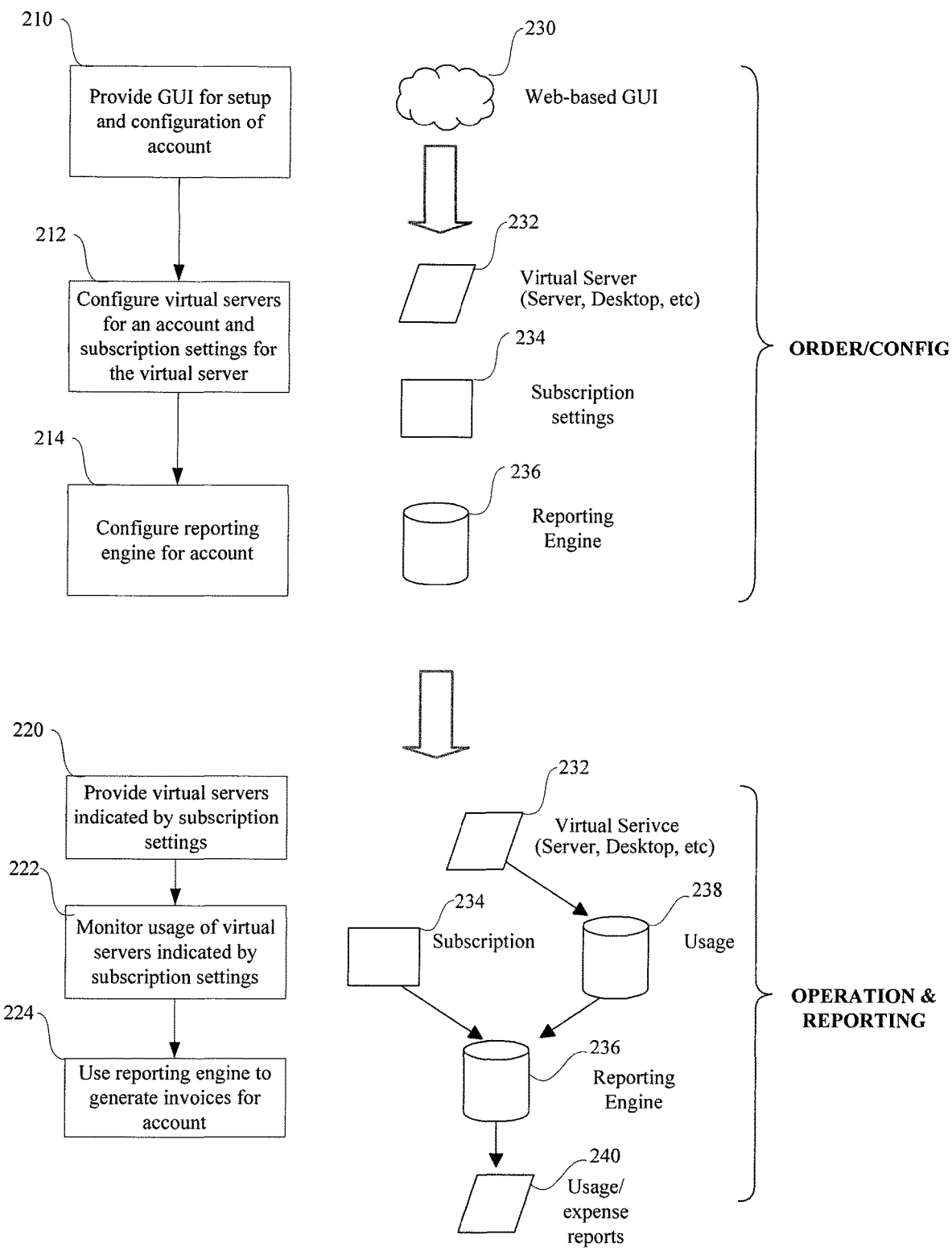
FIG. 2 shows an example flowchart for configuration, operation, and reporting for virtual servers for an account, in accordance with one or more implementations.

FIG. 2 shows an example flowchart for configuration, operation, and usage/expense reporting for virtual servers for an account, in accordance with one or more implementations. At block 210, a GUI is provided for setup and configuration of an account by an authorized user. The GUI may be, for example, a web-based GUI 230 accessible via a website. At block 212, one or more virtual servers 232 to be provided for the account are configured. Also at block 212, subscriptions settings 234 for use of the virtual servers are configured. The subscription settings 234 may specify various settings for account including, for example, users or third-party customers to be provided service by the individual virtual servers, user permissions, usage limits for the virtual servers 232 or users, service rates, and/or reporting options. At block 214, a reporting engine 236 for the account is configured. The reporting engine 236 generates reports for use of the virtual servers 232 according to service rates specified for the account, for example, in the subscriptions 234.

After setting up the server, subscription, and reporting, the virtual server(s) 232 are provided to the users or third-party customers at block 220. At block 222, usage of virtual servers indicated by the subscriptions 234 is monitored and logged, for example, in a usage database 238. At block 224, the reporting engine 236 is used to generate invoices 240 based on the usage 238 of the virtual servers 232 and the subscription settings 234 (e.g., service rates). The reporting engine 236 may generate an invoice for all virtual servers provided for the account or may generate invoices for individual virtual servers, users, or third-party customers.

Figure 3:
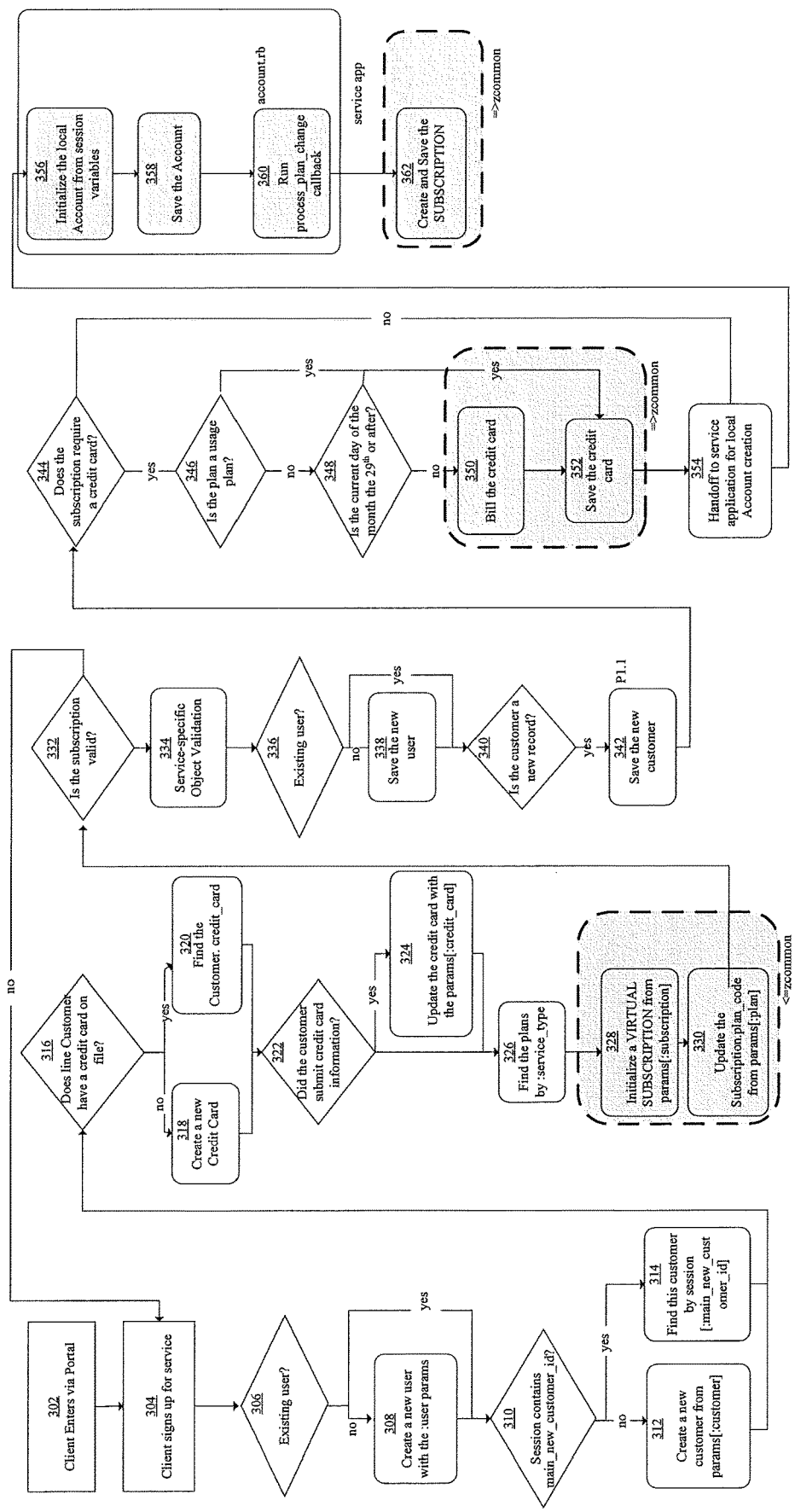
FIG. 3 shows a process for signup and configuration of an account, in accordance with one or more embodiments.

FIG. 3 shows a process for signup and configuration of an account, in accordance with one or more embodiments. At block 302 a customer enters the process via a portal (e.g., a web-accessible GUI or website). The customer signs up for service at block 304. If the customer is not an existing user at decision block 306, the process creates a new user with user parameters at block 308. Otherwise, the process continues to decision block 310. If the session contains a main_new_customer_id, the process finds the customer by the main_new_customer_id at block 314. Otherwise, a new customer is created at block 312. If the customer does not have a credit card on file at decision block 316, a new credit card is entered into the system at block 318. Otherwise, information for an existing credit card for the customer is located at block 320. If the customer submits credit card information, at decision block 322, the process updates the credit card information for the customer at block 324.

Plans for various service types requested by a user are located at block 326. A virtual subscription is initialized at block 328 and a subscription plan for the customer is updated at block 330. The virtual subscription is used to validate the subscription and bill the credit card for an initial amount. Reoccurring payments are setup later. If the subscription is valid at decision block 332, specific service object validation is performed at block 334. If the customer is not an existing user at decision block 336, a new user is created and saved at block 338.

If the customer is a new record, decision block 340 directs the process to save the new customer at block 342. If the subscription requires a credit card, credit card information is configured and stored for usage and/or expense reporting at blocks 344 through 352. If the plan is a usage plan, decision block 346 directs the process to save the credit card information at block 352 for later reporting. Otherwise, if the date is the beginning of a new reporting period, decision block 348 directs the process to bill the credit card at block 350 and save the credit card information at block 352. Creation of the account is initialized at block 354. The account is initialized using variables of the preceding session at block 356 and the account is saved at block 358. Maintenance processes may be run at block 360 to update plan changes. The subscription is created and saved at block 362.

Figure 4:
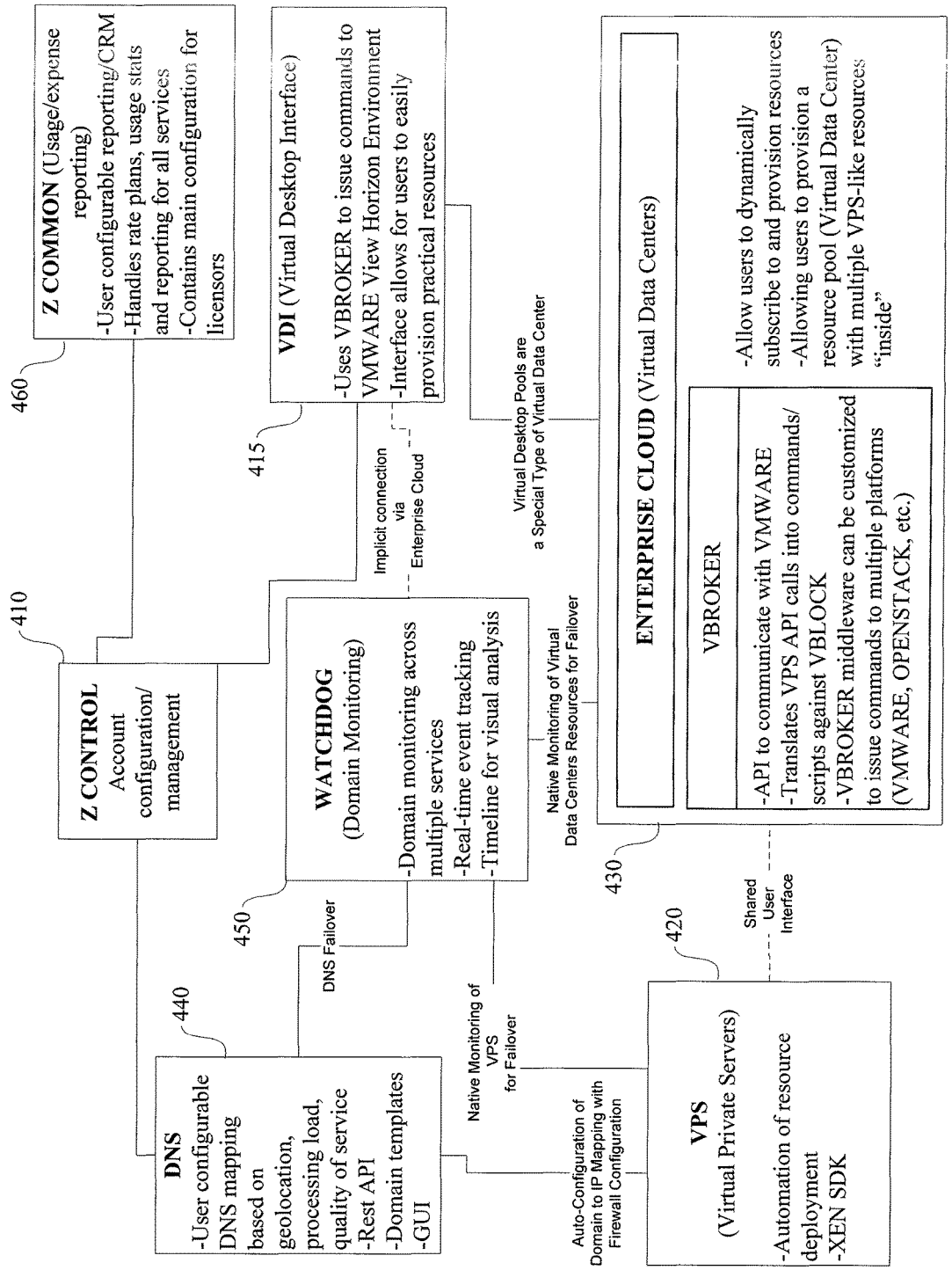
FIG. 4 shows a block diagram of an example system configured to provide respective groups of virtual servers for a number of accounts, in accordance with one or more implementations.

FIG. 4 shows a block diagram of an example system configured to provide respective groups of virtual servers for a number of accounts, and provide customizable usage and/or expense reporting for each account. FIG. 4 shows various subsystems included in the example system (Z_system). The system includes multiple subsystems configured to provide respective virtual servers/services for various user accounts. For example, the system includes a first subsystem virtual desktop interface (VDI) 415, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision virtual resources. In some implementations, the VDI subsystem 415 uses a subsystem VBROKER to issue commands to VMWARE View Horizon Environment. VBROKER is a full VMWARE view software development kit (SDK) that provides the ability to run custom Windows Powershell scripts against a VMWARE View Horizon Environment server in order to create, manage and synchronize information about desktop pool resources of the system. VBROKER may also be applicable to other subsystems shown in FIG. 4, as well as various other applications utilizing VMWARE.

The system also includes a second subsystem Virtual Private Servers (VPS) 420, which can be configured to virtualize various servers for an account. In some implementations, the VPS subsystem 420 automates deployment of resources allocated for an account. For instance, the VPS subsystem 420 may provide various virtual servers/services including, but not limited to, file servers, email servers, web hosting, and virtual meeting services (e.g., VoIP), etc. In some scenarios, the VPS subsystem 420 may be accessible by virtual desktops (via VDI), by external computers (via the internet), or both. In some implementations, the virtual servers/services provided by the VPS subsystem 420 may be configured using a SDK such as XEN. The SDK may be used, for example, to customize and/or maintain virtual services provided by the VPS system for an account.

The system shown in FIG. 4 also includes a third subsystem (Enterprise Cloud) 430 that is configured to provide a virtual data centers for an account. The Enterprise Cloud subsystem 430 allows users to dynamically subscribe to provision resources (e.g., virtual servers/services). Users may create a virtual data center having a pool of resources, which may include a number of VPS-like servers/services. For each account, a respective virtual data center provided by the Enterprise Cloud 430 may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center provided by the Enterprise Cloud 430 may include a firewall between a network and the virtual data center. Additionally or alternatively the virtual data center may include firewalls to protect individual virtual servers/desktops in the virtual data center.

In some implementations, a virtual data center provided by the Enterprise Cloud 430 for an account includes a group of virtual desktops and/or virtual servers indicated in respective settings files for the account. The virtual desktops and/or virtual servers in the virtual data center may be provided by the VDI and VPS subsystems 415 and 420 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VoIP), and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, computing servers of the Enterprise Cloud 430 emulate the virtual data center by emulating the virtual desktops and/or virtual servers indicated in the server settings, and also emulating the virtual connections specified in the data center configuration settings. In some implementations, emulation of the virtual data centers in the Enterprise Cloud 430 includes execution of a resource management process, configured to assign computing resources allocated for the virtual data center for emulation of the virtual desktops, virtual servers, and connections of the virtual data center.

In some implementations, a virtual data center provides a perimeter firewall between an internal network of the virtual data center and an external network. The perimeter firewall may provide network protection for the virtual data center with stateful packet inspection, access-control lists, network address translation (NAT), and virtual private network (VPN) connections. In some implementations, the virtual data center may also include individual firewalls isolating one or more virtual servers/desktops from other virtual servers/desktops in the virtual data center. In some implementations a web-based GUI is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 430 uses VBROKER to issue commands to VMWARE hosting the virtual servers/desktops. VBROKER provides an application program interface (API) to communicate with VMWARE. For example, VBROKER may translate VPS API calls into commands/scripts against VBLOCK. VBROKER may be used as middleware to issue commands to various platforms (e.g., VMWARE or OPENSTACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer-system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the virtual data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the virtual data center. The GUI may also provide a mechanism to import and/or replicate virtual machines in the virtual data center. In some implementations, the GUI may provide the ability to save a backup or snapshot of the layout and configuration of the virtual data center.

The system shown in FIG. 4 also includes a domain name server (DNS) subsystem 440. The DNS subsystem 440 is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 440 performs the mapping of the domain name associated with an account according to a respective set of mapping criteria indicated in a settings file of the account. For each account, the DNS subsystem 440 may map domain names to IP addresses of the virtual servers according to various mapping criteria. For example, in some implementations, the mapping criteria may cause the DNS subsystem 440 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 440 to map domain names based on processing load of the virtual servers. For instance, domain names may be mapped to balance processing load between a plurality of virtual servers. In some implementations, the mapping criteria may cause the DNS subsystem 440 to map domain names based on the geographical location of the user submitting a domain name query to the DNS subsystem 440.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 440 provides an representational state transfer (REST) API for configuration of DNS mapping for an account. In some implementations domain templates, having various preconfigured mapping criteria, may be provided for easy configuration of the DNS subsystem 440 for an account. In some implementations, the DNS subsystem 440 auto-configures mapping based on virtual services provided for the account by the other subsystems (e.g., 415, 420 and/or 430).

In some implementations, the DNS subsystem 440 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated with the account.

In this example, the system also includes a fourth subsystem (Watchdog) 450 configured to monitor status of the virtual servers/services provided for the various accounts. The Watchdog subsystem 450 is configured to determine the operating status of the virtual servers/services provided for each account. For instance, Watchdog subsystem 450 may be configured to monitor services provided by the other subsystems (e.g., 415, 420 and/or 430) for fall over. Watchdog subsystem 450 may provide domain monitoring across multiple services. The Watchdog subsystem 450 may provide real-time event tracking for the services for each account.

In some implementations, the Watchdog subsystem 450 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 450 may be configured to provide an alert to one or more authorized users of the account if the operating status of the virtual servers/services satisfies alert criteria indicated in an alert policy for the account. The Watchdog subsystem 450 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 440 is configured to map domain names to the virtual servers/services based on the operating statuses of the virtual servers/services, as determined by the Watchdog subsystem 450. For example, the DNS subsystem may be configured to remap a domain name from a first virtual server to a backup virtual server in response to the first virtual server becoming unresponsive.

The system shown in FIG. 4 also includes a subsystem (Z Common) 460 configured to provide usage and/or expense reporting for various services provided for an account. The subsystem handles rate plans, usage statistics, and reporting for various services of the system. The Z Common subsystem 460 may bill services using flat rates for specified time-periods (e.g., a monthly rate), or using service rates indicating a specified service rate for a specified amount of use (e.g., time, amount of data, and/or number of users). The Z Common subsystem 460 is configurable as a plug-and-play component to provide customizable reporting services for various independent systems. In some implementations, a GUI is provided for authorized users to manage services, reporting options, payment options, account specific alerts, and/or various administrated options. In some implementations, the GUI provides an interface for a user to configure subscription and reporting options.

The system includes a subsystem (Z Control) 410, which configures settings of one or more of the subsystems for respective accounts of the system. In some implementations, the Z Control subsystem 410 stores data indicating services, provided by the various subsystems (e.g., 415, 420, 430, 440, and/or 450), which are subscribed to for each account. The Z Control subsystem 410 may further store user-configurable settings for the subscribed to services for each respective account. For example, the settings for an account may indicate settings for one or more virtual servers provided for the account by the VPS subsystem 420. In some implementations, the Z Control subsystem 410 may provide a GUI for authorized users of an account to manage virtual services subscriptions, and/or various administrated options.

In some implementations, the Z Control subsystem 410 may also store settings for third-party customers of an individual client account. For example, a provider of an online service may have an account subscribing to one or more virtual servers specifically configured to provide the online service. The service provider may have third-party customers which pay for use of the online services of the service provider. In some implementations, the Z Control subsystem 410 may store data indicating third-party customers for an account and services to be provided for each third-party customer. The Z Common subsystem 460 may be configured to manage and track usage and/or expenses for each third-party customer of a client account. Reporting options may be individually configured for each third-party customer of an account. In some implementations the reporting options for each account and/or for each third-party customer of an account may be stored by the Z Control subsystem 410. In some implementations, the Z Control subsystem 410 may provide a GUI for authorized users of an account to manage virtual services subscriptions, third-party customers, billing/payment, account specific alerts and/or various administrated options.

Various aspects and features may be better understood with reference to the following example use-case. In this example, a company ABC, Inc. has decided to move the company's infrastructure from their in-house rack servers to cloud-based virtual servers. Currently, the company hosts numerous resources in-house including two custom web application servers, a mail server, a file server, an Active Directory Server and around 65 dedicated desktop machines. A company manager decides to subscribe to a set of virtual servers to be provided. For instance, the manager may opt to have the VPS subsystem provide virtual servers to replace ABC, Inc.'s in-house servers. In this example, the manager may choose between usage-based or monthly flat-rate billing for the virtual servers.

In one account creation scenario, the manager submits a sales request or contacts a sales representative/admin to discuss his needs and selection. Upon selecting a specific offering, a user account is created for the manager and the ABC, Inc. customer account is created on his behalf by the manager. Since the ABC, Inc. account is created in this manner, the manager can select from an array of billing types for this account (Auto-Charge, Invoice Net or Pre-paid.)

In another account creation scenario, the manager signs up for an account through a web portable. After making server selections, the manager is guided through the account creation process. The account is automatically created as an auto-charge account.

In these two scenarios, the manager may provide server information, user information and account and billing information for account configuration. The server information may include, for example, a server hostname, a location of the server (or cluster), and or a base image of the server (e.g., Linux Distro and version). The user information may include, for example, first and last name, email, phone number, and/or a password. The account and billing information may include, for example, company name, referral info, and/or credit card information for a one-time or recurring billing. Using the information provided by the manager, an account and subscription may be created using the process shown in FIG. 3, for example.

Various service/rate plans that may be selected corresponding to various services that may be provided by the subsystems. The manager may configure the account to allow other users within the ABC, Inc. organization to assist in the configuration/administration of virtual servers/resources provided by the system. In some implementations, the subscription is created from a rate_plan, which is a record stored in the Z Control subsystem that contains information about a salable resource. The information may include, for example, a rate_plan name, which is a machine-readable code referenced in the service application to apply the correct resources to the actual usable resource. The information may also include a human-readable name of the rate plan and a description of the plan. The information may further include a state of the plan (active, inactive, and/or hidden). In some implementations, a promo_code may be used by a customer to access a hidden rate_plan and create a subscription from it. The information for the rate_plan may also include a category, indicating which service application offering the plan belongs to (VPS, Enterprise Cloud, DNS, etc.). The information may indicate a rate type (subscription, usage or one-time), and/or cost of the rate_plan. The cost of the rate_plan may be stored as a hash that includes the cost for multiple reporting periods (monthly, quarterly, or annually). The information for the plan may also indicate start and end dates, so that specials/promos can be set and run automatically.

In one scenario, a rate_plan is selected when the manager signs up for the VPS service. A subscription object is created that is a copy of the rate_plan with additional information that relates the subscription to the ABC, Inc. account and provides information about when and how it was created. For instance, the subscription object may indicate the day the subscription was started for determining reporting period.

In some implementations, a processing circuit (e.g. the Z Common subsystem in FIG. 4) runs a reporting process, which looks through all accounts and creates subscription cycles, usage statistics, invoices and receipts based on the status of the subscriptions on the account. For instance, if the manager signed up for the VPS service on the 15$^{th}$ day of a month, on the 15th of each month the ABC, Inc. account will be included in the conditional match run by the biller object. An expense or usage report will be created for each service and the provided credit card will be charged for the total. The biller will generate a receipt and send it to the manager's email address.

As a further use-case, ABC, Inc. may later decide to subscribe to additional virtual servers. For instance, a year later, ABC, Inc. may have added 20 new sales agents to their staff. Instead of buying 20 new desktops, the manager may opt to host virtual desktops in the cloud (e.g., using the VDI subsystem). The account may be configured to separately track each virtual resource with a respective invoice. Rather than creating a separate account to handle these resources, the system allows the manager to create a department account named "ABC, Inc. Sales" which belongs to the parent account "ABC, Inc." The manager can administrate the provisioning and management of the virtual resources for this department and he can add administrative users to these departments just as he can for the parent account. This allows separate accounting to be maintained for multiple departments, while allowing ABC, Inc. to pay for subscriptions of all departments with a single transaction.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIGS. 1, 2, and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, in which the first module includes a first CPU hardware circuit with one set of instructions, and the second module includes a second CPU hardware circuit with another set of instructions.

Certain embodiments are directed to a computer program product (e.g., nonvolatile memory device), which includes a machine or computer-readable medium, having stored thereon, instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure, even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. An apparatus, comprising:
a set of computing servers configured and arranged to provide a respective set of virtual servers for each of a plurality of accounts, wherein each respective set of virtual servers is uniquely associated with one of the plurality of accounts in accordance with virtual server subscription settings included in an account settings file of the respective account, the respective set of virtual servers for at least one of the accounts including a data communications server; and
for each of the plurality of accounts, a processing circuit communicatively coupled to the set of computing servers and configured and arranged to
select options for reporting use of the respective set of virtual servers including usage of services by a set of users of the respective account, responsive to input by an authorized user of the account via a graphical user interface (GUI);
monitor use of the respective set of virtual servers and the usage of the services provided for the respective account; and
generate reports, according to the selected options, for use of the respective set of virtual servers and the services based on the usage by the set of users of the respective account.

2. The apparatus of claim 1, wherein the report is generated based on the usage and according to the subscription settings of the account and wherein the processing circuit is further configured to, responsive to input via the GUI, add and remove users of the set of virtual servers for the account.

3. The apparatus of claim 2, wherein the processing circuit is further configured to, responsive to input via the GUI, configure virtual servers to be provided for each user of the set of virtual servers for the account.

4. The apparatus of claim 2, wherein the subscription settings of the account include users or customers to be provided service by respective virtual servers, user permissions, usage limits for virtual server, service rates, and wherein the processing circuit is further configured to, responsive to input via the GUI, adjust service rates for each user set of virtual servers for the account.

5. The apparatus of claim 1, wherein the processing circuit is configured and arranged to, for each of the plurality of accounts, generate a report for all use of the set of virtual servers provided for the account by the set of computing servers according to the selected options.

6. The apparatus of claim 1, wherein the processing circuit is further configured to, responsive to input via the GUI, generate a report indicating respective use of the virtual servers and the services by an individual one of the users.

7. The apparatus of claim 1, wherein the processing circuit is further configured to, responsive to input via the GUI, generate a report indicating respective use of the virtual servers and the services by a subset of the users of the respective account, and wherein the processing circuit is further configured to, responsive to input via the GUI, adjust service rates for each of the set of virtual servers of the account.

8. The apparatus of claim 1, wherein each of the plurality of accounts includes a respective plurality of third-party customers which pay for use of virtual services of a service provider via the respective account, and the set of computing servers are configured and arranged to provide each of the plurality of third-party customers a respective subset of the corresponding set of virtual servers for the account.

9. The apparatus of claim 8, wherein the processing circuit is further configured to, responsive to input via the GUI, define the plurality of third-party customers and adjust service rates for individual ones of the plurality of third-party customers.

10. The apparatus of claim 9, wherein the processing circuit is configured and arranged to, for each of the plurality of accounts:
generate a single report for all use of the set of virtual servers provided for the account by the set of computing servers according to an account-level service rate indicated in the selected options; and
for each of one of more third-party customers of the account, generate a respective report for use of the set of virtual servers by the third-party customer according to a respective customer-level service rate indicated in the selected options.

11. A method, comprising:
using a set of computing servers, providing a respective set of virtual servers for each of a plurality of accounts, wherein each respective set of virtual servers is uniquely associated with one of the plurality of accounts in accordance with virtual server subscription settings included in an account settings file of the respective account, and wherein the subscription settings specify third-party customers to be provided services by the individual virtual servers, the respective set of virtual servers for at least one of the accounts including a data communications server, the services including use of file servers, email servers, web hosting, and meeting services; and
for each of the plurality of accounts
selecting options for reporting usage of the respective set of virtual servers including usage of the services by a set of users for the respective account, in response to input by an authorized user of the account via a graphical user interface (GUI);
monitoring use of the respective set of virtual servers and the usage of the services provided for the respective account; and
generating reports, according to the selected options, for use of the respective set of virtual servers and the services based on the usage by the set of users of the respective account.

12. The method of claim 11, wherein the generated report is further based on service rates for the set of users of the respective account, the method further comprising defining a set of users of the set of virtual servers for the account in response to input via the GUI.

13. The method of claim 12, further comprising configuring virtual servers to be provided for each of the set of users in response to input via the GUI.

14. The method of claim 12, further comprising adjusting the service rates for each user set of virtual servers for the account in response to input via the GUI.

15. The method of claim 12, further comprising generating a single report for use of the set of virtual servers in a reporting period according to the selected options and generating additional reports for different subsets of users usage of the set of virtual servers in the reporting period.

16. The method of claim 11, further comprising
generating a report indicating respective use of the virtual servers by each of the users; and displaying the report via the GUI.

17. The method of claim 11, further comprising adjusting service rates for each of the set of virtual servers of the account in response to input via the GUI.

18. The method of claim 11, wherein
each of the plurality of accounts includes a respective plurality of third-party customers; and
the providing the respective set of virtual servers for an account includes providing a respective subset of the set of virtual servers for each of the plurality of third-party customers.

19. The method of claim 18, further comprising
generating a single report for all use of the set of virtual servers provided for the account, according to an account-level service rate indicated in the selected options; and
for each of the plurality of third-party customers of the account, generating a respective report for use of the set of virtual servers by the third-party customer according to a respective sub-set of options for the third party customer.

20. An apparatus, comprising:
a computing circuit configured and arranged to provide a respective set of virtual servers for each of a plurality of accounts, wherein each respective set of virtual servers is uniquely associated with one of the plurality of accounts in accordance with virtual server subscription settings included in an account settings file of the respective account, the respective set of virtual servers for at least one of the accounts including a data communications server wherein the virtual server subscription settings specify usage limits and service rates for the virtual servers; and
a processing circuit configured and arranged to
select options for reporting use of the respective set of virtual servers including usage of services by users of the plurality of accounts in response to input via a graphical user interface (GUI) by authorized user of the account;
select a respective set of mapping criteria associated with the respective account, responsive to input by the authorized user of the account via the GUI;
monitor, for each of the plurality of accounts, use of the respective set of virtual servers and the usage of the services provided for users of the plurality of accounts; and
generate reports, according to the selected options, for use of the respective set of virtual servers and services provided based on usage by a set of users and subscription settings of each of the plurality of accounts and according to subscription settings of each of the plurality of accounts.

* * * * *